United States Patent [19]
Fredriksson

[11] Patent Number: 5,829,810
[45] Date of Patent: Nov. 3, 1998

[54] HOISTING LINK DEVICE

[75] Inventor: Lars Fredriksson, Åkersberga, Sweden

[73] Assignee: Frenolink Forvaltnings AB, Akersberga, Sweden

[21] Appl. No.: 771,259

[22] Filed: Dec. 20, 1996

[30] Foreign Application Priority Data

Dec. 22, 1995 [SE] Sweden ................................. 9504632

[51] Int. Cl.⁶ ...................................................... B66C 1/12
[52] U.S. Cl. ......................... 294/82.12; 24/116 R; 59/93
[58] Field of Search ............................. 294/82.1, 82.11, 294/82.12, 74; 24/116 R, 129 R, 129 A; 59/93

[56] References Cited

U.S. PATENT DOCUMENTS

| 569,448 | 10/1896 | Dudley | 294/82.12 |
|---|---|---|---|
| 1,709,244 | 4/1929 | Abbe | 294/82.12 |
| 3,583,751 | 6/1971 | White | 294/74 |
| 3,724,035 | 4/1973 | Smith . | |
| 4,264,097 | 4/1981 | Rehbein | 294/82.11 |
| 4,280,728 | 7/1981 | Fredriksson | 294/82.11 |
| 4,556,246 | 12/1985 | Millington . | |

FOREIGN PATENT DOCUMENTS

| 3338-674 | 5/1985 | Germany | 294/82.11 |
|---|---|---|---|
| 4241667 | 6/1994 | Germany | 294/82.12 |
| WO96/00861 | 1/1996 | WIPO . | |

Primary Examiner—Dean Kramer
Attorney, Agent, or Firm—Quarles & Brady

[57] ABSTRACT

A hoisting link device, comprising an upper link part (2) forming a closed loop dimensioned to be hung onto a lifting hook, and a lower chain connection part (3) to be connected to an end portion of a chain hanging down therefrom. The chain connection part comprises a fork-like lower end portion with two substantially parallel shanks (3a, 3b) defining a slot (4) therebetween, a bridge portion (5) connecting the two shanks to each other, an anchoring member (6) located below said bridge portion for securely anchoring an end link of said chain. An upper or central portion (4b) of the slot communicates with an insertion opening (4d) located at one lateral side of the device. The upper portion (4b) of the slot is adapted to accommodate a centrally located support link (102) of the chain end portion (3) so as to form a shortening loop between the centrally located link and the end link of the hoisting chain.

12 Claims, 7 Drawing Sheets

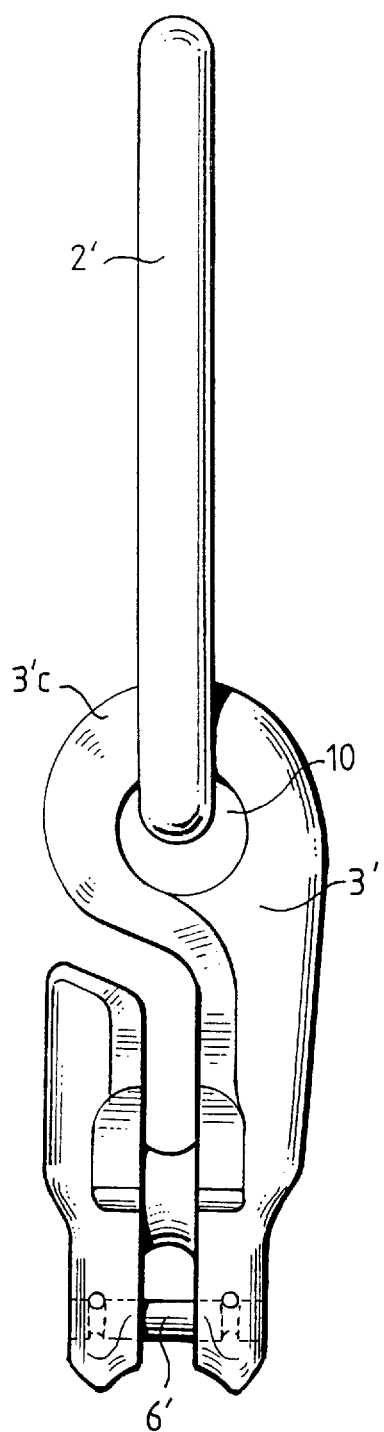
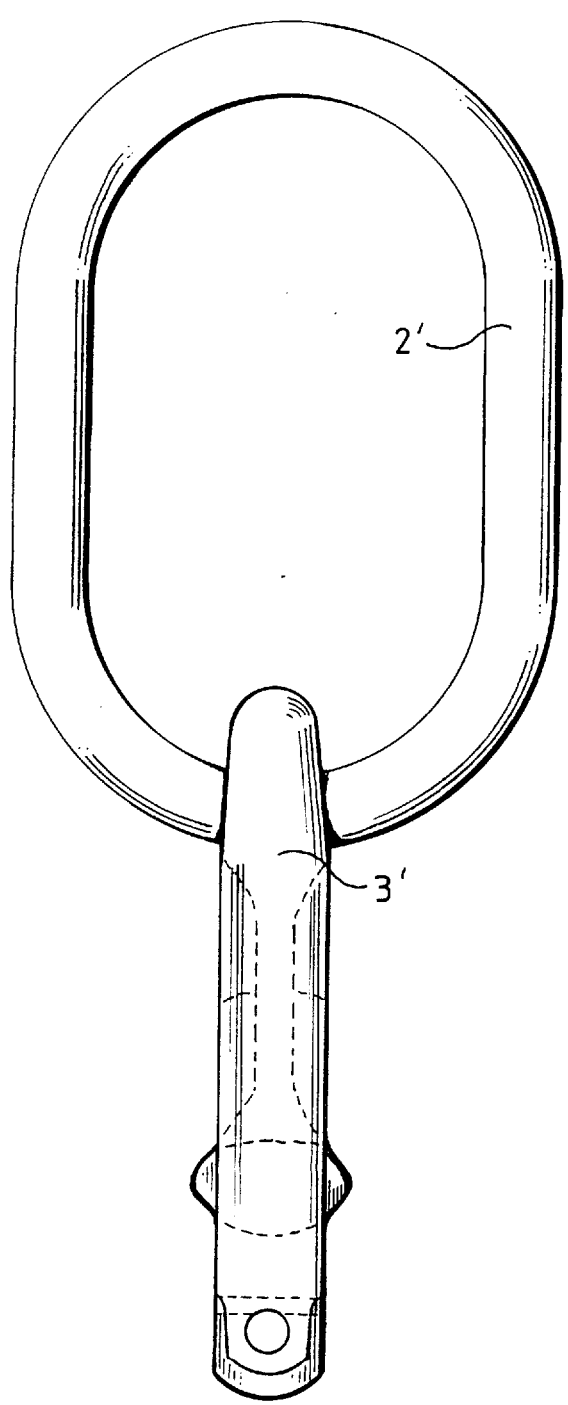

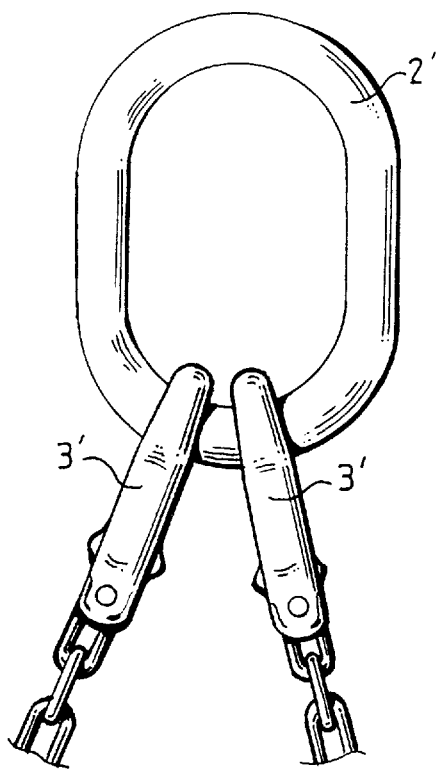
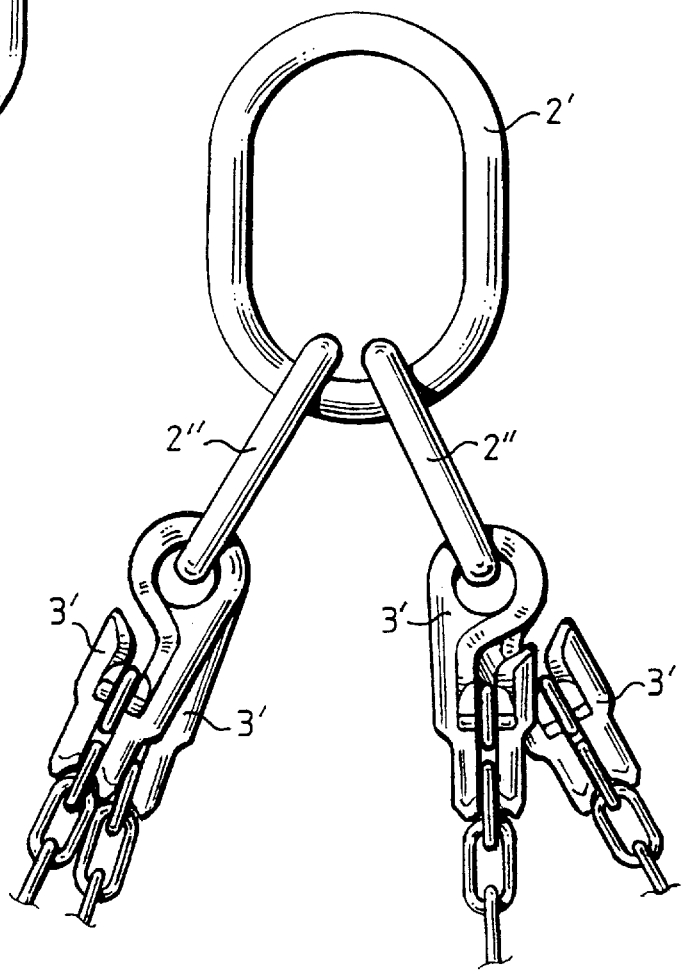

5,829,810

HOISTING LINK DEVICE

FIELD

The present invention relates to a hoisting link device, comprising an upper link part forming a closed loop dimensioned to be hung onto a lifting means, such as a hook or a larger link, and a lower chain connection part to be connected to a chain hanging down therefrom.

PRIOR ART

Such a device is described in the international patent application No. PCT/SE95/00766.

The hoisting link device disclosed in the last mentioned document is constituted by a link body made in one piece including an upper closed loop part, a mid part, and a lower fork-like end part. The upper loop part defines a free interior space which directly adjoins and merges with a slot in the mid part. A hoisting chain to be connected to the lower end part is anchored with an end link at the lower free end of the link body, and a loop of the hoisting chain is pulled through the upper closed loop. A selected support link of the hoisting chain is then displaced into the adjoining support slot of the mid part so as to form a (normally non-loaded) shortening loop between the support link and the end link of the hoisting chain. Hereby, the effective length of the hoisting chain can be adjusted at will.

However, as described above, it is necessary to pull the hoisting chain through the upper closed loop, e.g., before anchoring the end link thereof at the anchoring pin.

SUMMARY OF THE INVENTION

Against this background, the object of the present invention is to accomplish a hoisting link device which permits an easier adjustment of the effective length of the hoisting chain while maintaining the advantages of the link device disclosed in the above mentioned document. In particular, it should not be necessary to pull the hoisting chain through the upper closed loop of the device. Still, the device should provide a protected and well-defined positioning of the centrally located link of the hoisting chain in accommodated position. Moreover, it should be relatively simple and have a light weight structure. Furthermore, it should be easy to handle and be useful in many different applications.

According to the invention, for a hoisting link device of the kind stated in the first paragraph, the above mentioned objects are achieved in that the lower chain connection part is directly secured to the upper link part, without any intermediate link, and in that the chain connection part comprises a fork-like lower end portion with two substantially parallel shanks defining a slot therebetween, a bridge portion connecting the two shanks to each other, an anchoring means located below said bridge portion for securely anchoring an end link of said chain, and a central portion of said slot being adapted to accommodate one of the links of said chain at a central location adjacent to said bridge portion so as to form a shortening loop between said centrally located link and said end link, said centrally located link being introduced sideways through an insertion opening located at one lateral side of the device in close proximity to said upper link part and communicating with said central portion of said slot.

With such a structure, the hoisting chain can be anchored to the anchoring means at the lower end of the chain connection part. Then, a selected link can be inserted sideways into the insertion opening and be displaced into the slot, where it is accommodated in a well-defined central position while forming a shortening loop as desired. Moreover, the overall dimension of the device, in the vertical direction of the loading force, is kept rather small, especially compared to conventional components coupled in series to one another.

The link device can be constituted by a unitary piece of metal, preferably produced by forging. Alternatively, the device can include two or more members, wherein the upper link part comprises a ring member being coupled to the lower chain connection part, which forms another member.

These and other features are stated in the dependent claims and will appear from the detailed description below.

The invention will be described further below with reference to the appended drawings illustrating some preferred embodiments.

BRIEF DESCRIPTION OF THE DRAWINGS

FIG. 4 is a side view of a second embodiment, including an upper link part and a lower chain connection part;

FIG. 5 is a view seen from the right in FIG. 4;

FIG. 6 shows an upper link part and two lower chain connection parts being permanently coupled to each other;

FIG. 7 shows four chain connection parts being permanently coupled to a number of ring members;

FIG. 8b is a sectional view of the lower chain connection part shown in FIG. 8a;

FIG. 11b is a partial, sectional view along the line XI—XI in FIG. 11a;

DETAILED

Figure 1:
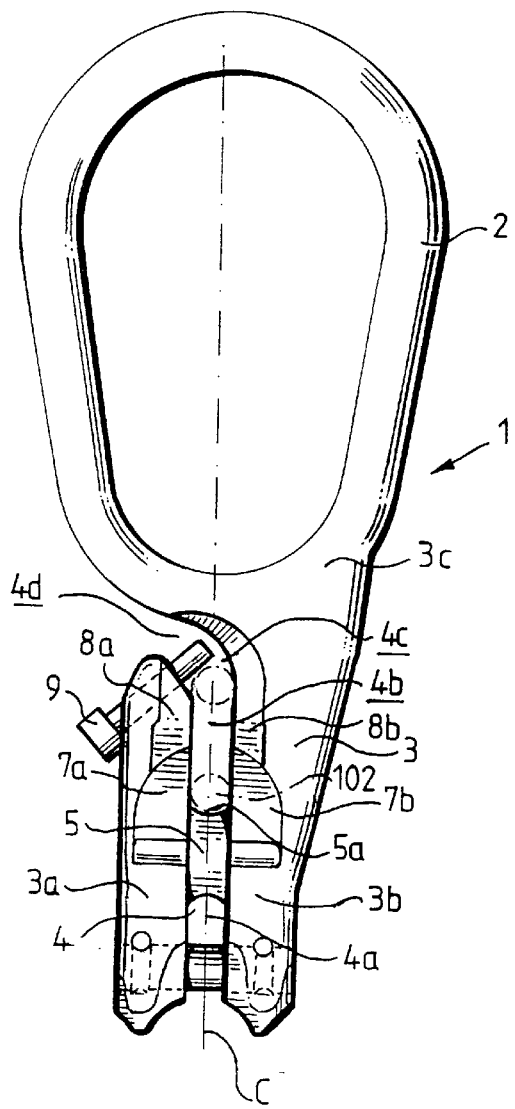
FIG. 1 is a side view of a unitary hoisting link device according to the invention.
Figure 2:
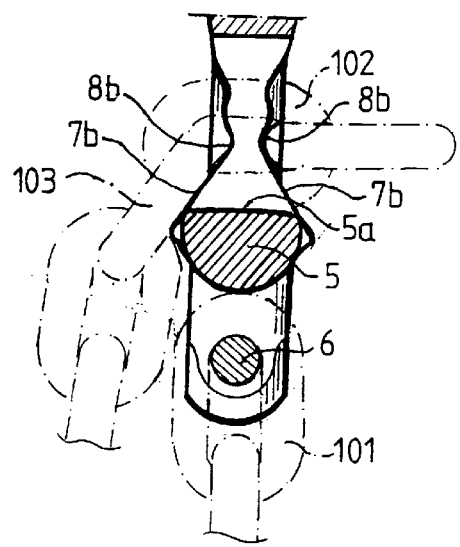
FIG. 2 is a sectional view of the lower chain connection part of the device.

The hoisting link device shown in FIGS. 1 and 2 is constituted by a unitary piece of metal, in particular steel, and produced by forging.

The unitary link body 1 includes a closed upper loop part 2, which is wide enough to be hung onto a lifting hook, or some other lifting means, and a lower chain connection part 3 to be connected to an end portion of a chain hanging down therefrom (not shown in FIG. 1).

The chain connection part 3 includes an upper end portion 3c, which merges with the upper loop part 2, and a fork-like lower end portion having two substantially parallel shanks 3a, 3b defining a slot 4 therebetween. One of the shanks, i.e. the shank 3b to the right in FIG. 1, is formed as a unitary extension of the upper end portion 3c. A bridge portion 5 connects the two shanks 3a, 3b to each other and divides the slot 4 into a lower portion 4a and an upper or central portion 4b. In the lower portion 4a of the slot, adjacent to the free ends of the shanks 3a, 3b, there is a transverse anchoring pin 6 located below the bridge portion 5 for securely anchoring an end link 101 of a hoisting chain which is to hang down from the link device. The upper or central portion 4b of the slot communicates with a curved slot portion 4c, which is curved sideways, away from the central, longitudinal axis C of the link device, ending in an insertion opening 4d located in close proximity to the upper loop part 2. Upon securing an end link 101 of the hoisting chain to the anchoring pin 6, a selected support link of the hoisting chain can be inserted sideways into the insertion opening 4d and be displaced into a well-defined central position resting on the bridge portion 5. As appears from FIG. 2, the support link 102 is then oriented with its longitudinal axis at right angle to the longitudinal axis of the link body 1. A longitudinal side of the support link 102 will then bear on an upper support surface 5a of the bridge portion 5.

In this position, a (normally non-loaded) shortening loop is formed on one lateral side of the link body 1 (to the right in FIG. 2), whereas the rest of the hoisting chain hangs down on the other side of the link body (to the left in FIG. 2). The link 103, which adjoins the support link 102 on said other (normally loaded) side, rests flat on inclined lateral support surface portions 7a, 7b at the shanks 3a, 3b, and an end portion of the link 103 engages with recessed seating surfaces 8a, 8b.

Optionally, a locking pin 9 can be mounted adjacent to the insertion opening 4d so as to lock in the support link 102 in its supporting central position.

Figure 3:
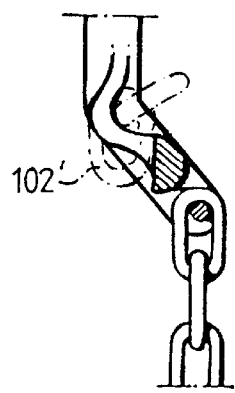
FIG. 3 is a corresponding sectional view of a modified embodiment of the lower chain connection part.

The lower chain connection part 3 may be modified. Compare FIGS. 3, 4, 8, 8a, 9 and 11a. In the example illustrated in FIG. 3, the supporting link 102' located in a central position in the slot between the shanks 3a, 3b is standing upright in parallel with the central axis of the link body 1. The upper or central slot portion 4b, the curved portion 4c and the insertion opening 4d are basically the same as in FIG. 1. However, in this case, the supporting link 102' should be turned into a horizontal position, corresponding to the position of the link 102 in FIG. 2, before it is slid out through the curved portion 4c and the insertion opening 4d.

The second embodiment of the hoisting link device shown in FIGS. 4 and 5 differs from the first embodiment in that the upper link part, forming a closed loop, is constituted by an oval ring member 2', which is permanently coupled to the lower chain connection part 3', the latter having the same structure as in FIG. 1 except for the upper end portion 3'c thereof which is provided with a closed circular eye 10 accommodating the upper ring member 2' being welded into a closed loop at the time of manufacture. The lower chain connection part 3' has the same structure and function as the one in FIG. 1 although it is movable to some extent in relation to the upper ring member 2'.

As shown in FIG. 6, it is possible and often advantageous to permanently couple two chain connection parts 3' to a ring member 2'. In this way, one obtains a chain sling with two sling parts or branches, the ends of which hang down from the respective chain connection parts 3'. A shortening loop can then be arranged at one or both of the chain connection parts 3'.

In FIG. 7, two ring members 2" are permanently coupled to a large ring member 2'. In each smaller ring member there are two chain connection parts 3', whereby two chain slings (with a total of four sling parts or branches) hanging down from the same ring member 2' can be hung onto a lifting hook or the like.

Figure 8:
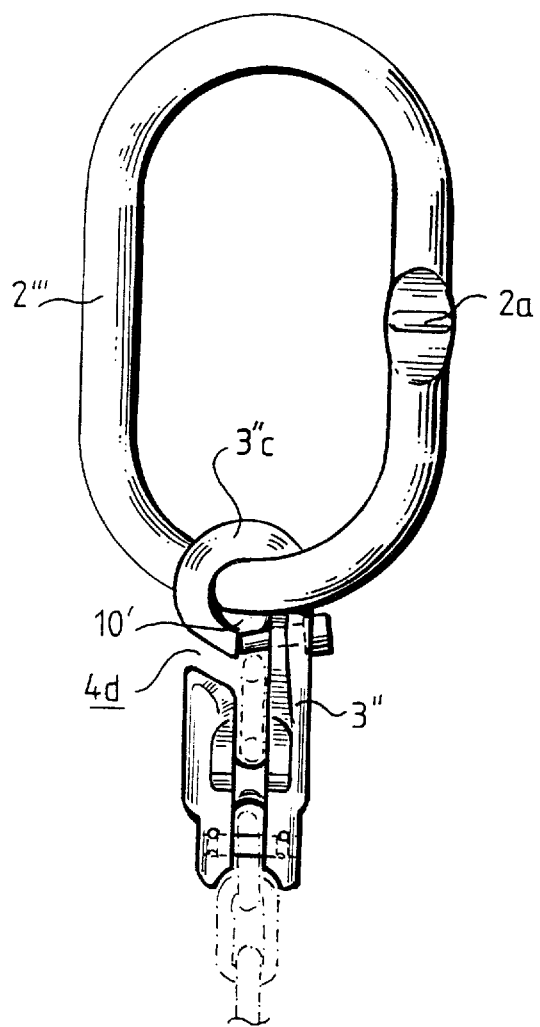
FIG. 8 is a side view of a third embodiment, including an upper ring member and a lower chain connection part being detachably coupled thereto.

The embodiment shown in FIG. 8 is similar to the one shown in FIGS. 4 and 5. In this case, however, the lower chain connection part 3" is detachable from the ring member 2'". To achieve this, the upper end portion 3"c of the chain connection part 3" is open so as to form a hook member 10', which encircles and engages with the upper ring member 2'" and communicates with the insertion opening 4d. Correspondingly, the ring member 2'" has a narrow, flattened portion 2a which fits snugly into the insertion opening 4d and enables coupling the parts 3" and 2'" securely together, as well as taking them apart from one another.

Figure 8A:
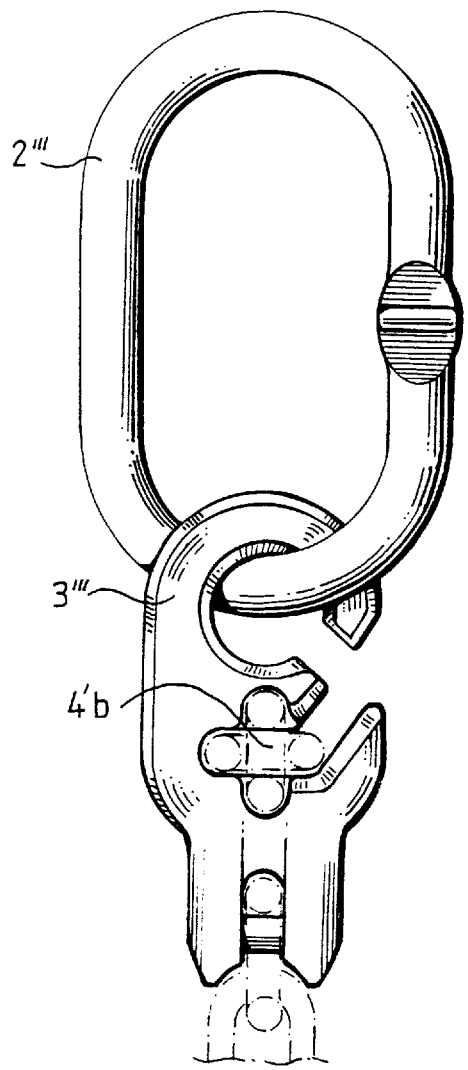
FIG. 8a shows, in a view corresponding to FIG. 8, an upper ring member and a modified embodiment of the lower chain connection part.
Figure 8B:
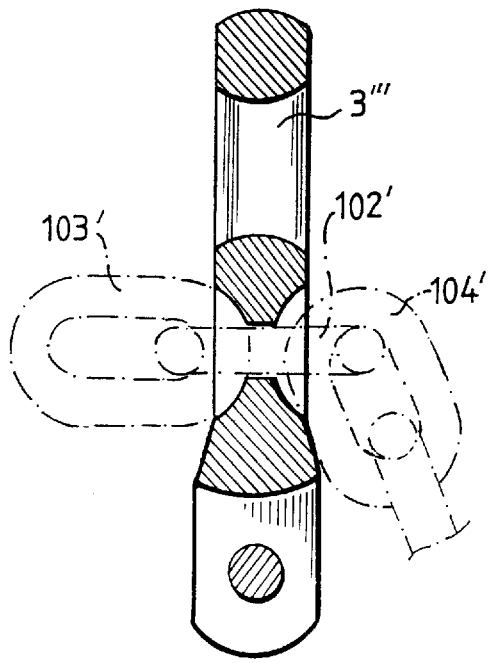

FIGS. 8a and 8b illustrate an embodiment similar to the one shown in FIG. 8. Moreover, the lower chain connection part 3'" is modified in that the upper or central portion 4'b of the slot is curved into a horizontal plane in which the central link 102' is located, whereas the two adjoining links 103', 104' on each side of the lower chain connection part 3'" are oriented in a vertical plane (see FIG. 8b).

Figure 9:
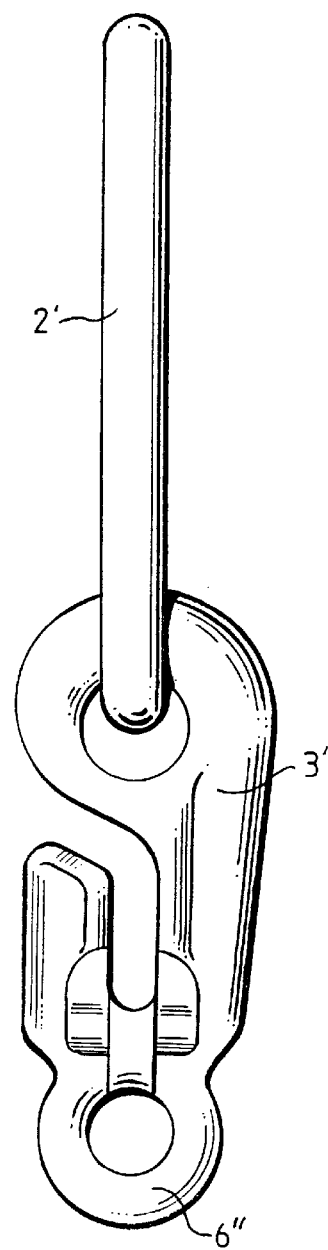
FIG. 9 illustrates a modification of the second embodiment, with a modified lower chain connection part coupled to an upper ring member.

The embodiment shown in FIG. 9 corresponds to the embodiment of FIG. 4. However, instead of a detachable anchoring pin, the lowermost end of the chain connection part 3' is constituted by a closed loop portion 6" forming an eye.

Figure 10:
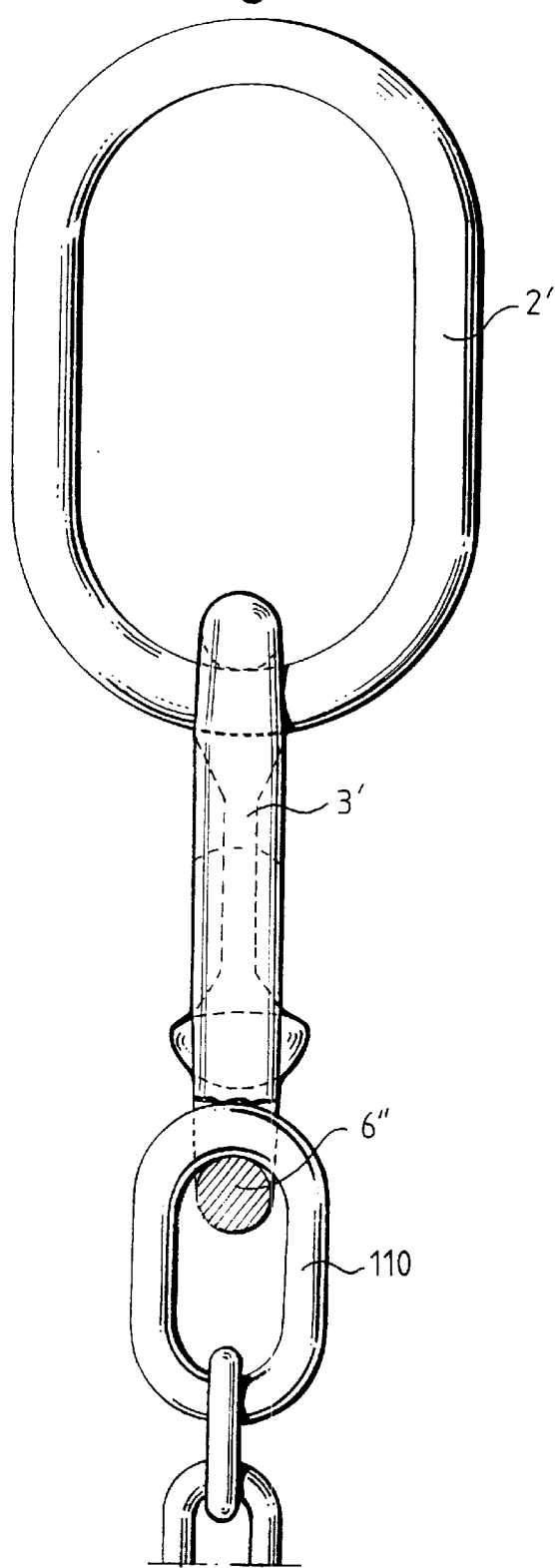
FIG. 10 shows the device of FIG. 9 connected to a hoisting chain via a permanently coupled link.

The eye 6" can be connected either to a permanently coupled link or ring member 110, as shown in FIG. 10, or alternatively to a detachable shackle.

Figure 11A:
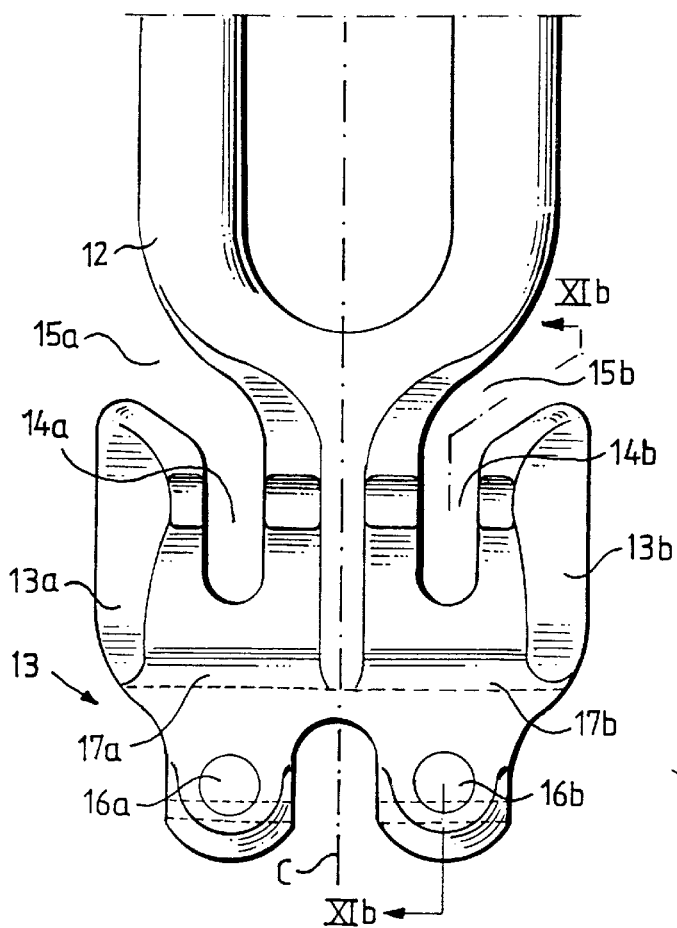
FIG. 11a is a side view of a fourth embodiment with a unitary hoisting link device having a double chain connection part.
Figure 11B:
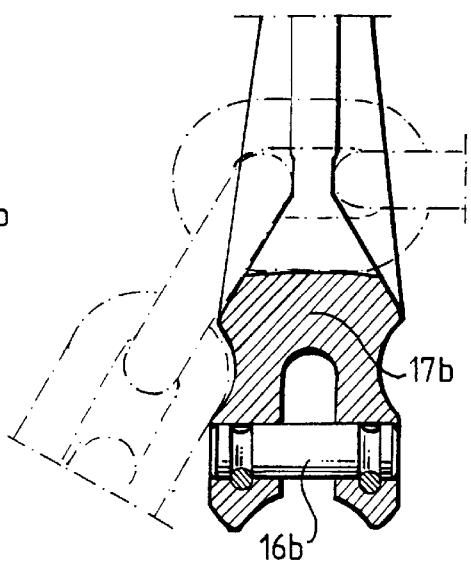

In the fourth embodiment of the hoisting link device, illustrated in FIGS. 11a and 11b, the chain connection part 13 is double so as to enable the connection of two chains or chain branches to the same lower part 13. The closed upper loop part 1, to be hung onto a lifting hook or the like, is unitary extended downwards into the lower chain connection part 13, which has a double configuration with two symmetrically located sections 13a, 13b, each having a link accommodating slot 14a, 14b, provided with an associated insertion opening 15a, 15b, and an anchoring pin 16a, 16b located in a lower part of the respective slot below a bridge portion 17a, 17b. The slots 14a, 14b extend in parallel planes on each side of the longitudinal axis of the link device, and the insertion openings 15a, 15b face away from each other. Accordingly, two separate chains can be conveniently coupled to the sections 13a, 13b, independently of each other, the respective end link being anchored to the respective pin 16a, 16b.

Figure 11C:
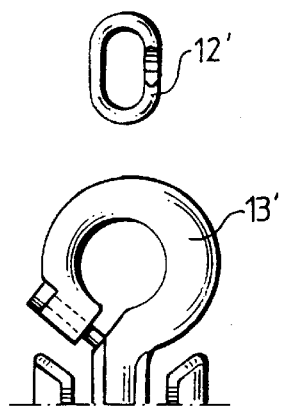
FIG. 11c and 11d are side views, partially cut away at the bottom, of two modified versions of the fourth embodiment.
Figure 11D:
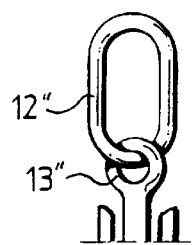

As illustrated in FIGS. 11c and 11d, this fourth embodiment may include a detachable upper ring member 12' (FIG. 11c) or an upper ring member 12" (FIG. 11d) being permanently coupled to the double chain connection part 13', 13".

I claim:

1. A hoisting link device, comprising an upper link part forming a closed loop dimensioned to be hung onto a lifting means, and a lower chain connection part to be connected to a chain hanging down therefrom, wherein an upper end portion of said lower chain connection part is directly secured to said upper link part, without any intermediate link, and in that the chain connection part comprises a fork-like lower end portion with two substantially parallel shanks defining a slot therebetween, a bridge portion connecting the two shanks to each other, an anchoring means located below said bridge portion for securely anchoring an end link of said chain, and a central portion of said slot being adapted to accommodate one of the links of said chain at a central location adjacent to said bridge portion so as to form a shortening loop between said centrally located link and said end link, said centrally located link being introduced sideways through an insertion opening located at one lateral side of the device in close proximity to said upper link part and communicating with said central portion of said slot the width of the central portion of said slot being dimensioned to prevent an engagement link from passing through said central portion, said shanks being provided with recessed seating surfaces for engagement with said engagement link.

2. A hoisting link device as defined in claim 1, wherein the device comprises a unitary piece of metal.

3. A hoisting link device as defined in claim 1, wherein the upper link part comprises a ring member being coupled to said lower chain connection part, which forms another member.

4. A hoisting link device as defined in claim 3, wherein said ring member is in turn coupled to a larger ring member being coupled to at least two ring members and associated members forming said lower chain connection parts.

5. A hoisting link device as defined in claim 3, wherein said upper end portion of said lower chain connection part forms a hook member engaging directly with said ring member and wherein the opening of said hook member also forms said insertion opening.

6. A hoisting link device as defined in claim 5, wherein said hook opening has a width corresponding to a flat portion of said ring member.

7. A hoisting link device as defined in claim 1, wherein recessed seating surfaces are located adjacent to said bridge portion.

8. A hoisting link device as defined in claim 1, wherein said device has an anchoring member which comprises a detachable pin extending transversely across a lower portion of said slot.

9. A hoisting link device as defined in claim 1, wherein said device has an anchoring member which comprises a closed loop portion being unitary with the lower ends of said substantially parallel shanks so as to form an eye.

10. A hoisting link device as defined in claim 1 wherein said central portion of the slot in the chain connection part is adapted to accommodate said centrally located link in a vertical plane.

11. A hoisting link device as defined in claim 1, wherein said central portion of the slot in the chain connection part is adapted to accommodate said centrally located link in a horizontal plane.

12. A hoisting link device as defined in claim 1, wherein said chain connection part is double with a link accommodating slot on each side of a longitudinal axis of the link device, and with associated insertion openings facing in opposite directions away from each other.

* * * * *